Jan. 30, 1968  B. E. HARDY  3,366,396

WORKMAN'S CART FOR FLOOR FILING

Filed Oct. 22, 1965  2 Sheets-Sheet 1

INVENTOR
Bernard E. Hardy

BY Munson H. Lane
ATTORNEY

Jan. 30, 1968    B. E. HARDY    3,366,396
WORKMAN'S CART FOR FLOOR FILING
Filed Oct. 22, 1965    2 Sheets-Sheet 2
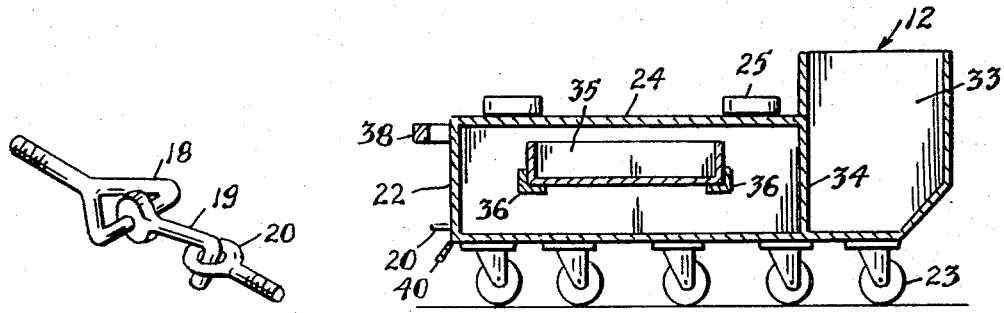
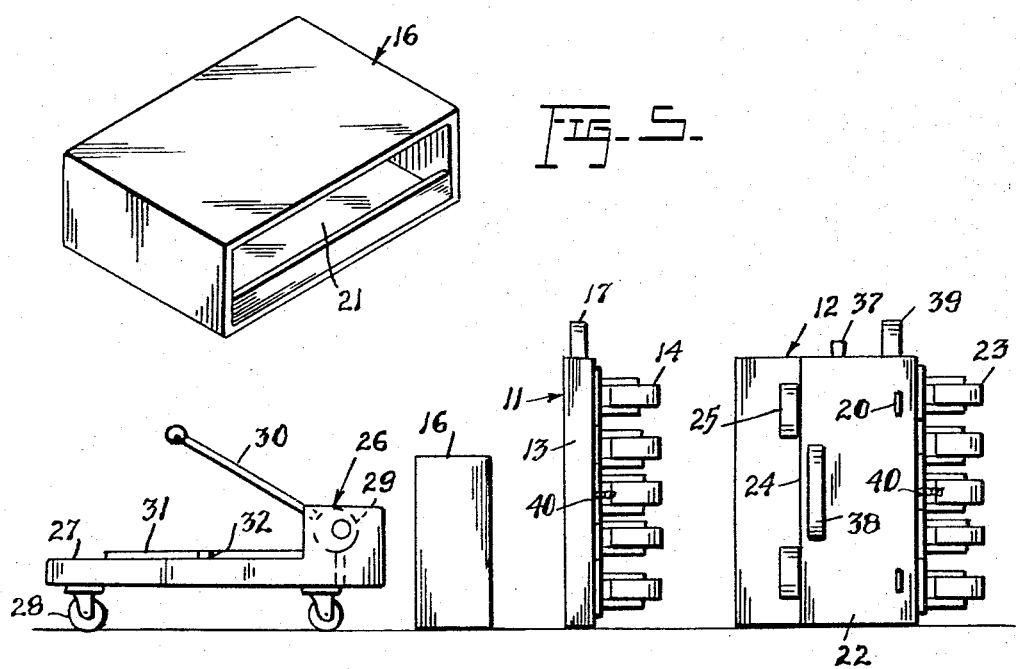
INVENTOR
Bernard E. Hardy
BY Munson H. Lane
ATTORNEY

United States Patent Office 3,366,396
Patented Jan. 30, 1968

3,366,396
WORKMAN'S CART FOR FLOOR FILING
Bernard E. Hardy, 3009 Patterson Ave.,
Richmond, Va. 23221
Filed Oct. 22, 1965, Ser. No. 501,854
3 Claims. (Cl. 280—32.5)

ABSTRACT OF THE DISCLOSURE

This application discloses a workman's cart particularly adapted for use while cutting and laying floor tile, said cart comprising a leading cart member including a platform affording a tile storage space, casters supporting said platform, a box-like container positioned on said platform in rear of and adjacent to said tile storage space and affording a seat for a rearwardly facing workman, a trailing cart member separably connected to the rear of said leading cart member, said trailing cart member including a hollow body having a top wall and provided rearwardly of said top wall with a receptacle for scrap tile, casters supporting said hollow body, mounting blocks provided on said top wall, and a tile cutting machine removably positioned on said mounting blocks and accessible to a workman on said seat.

---

This invention relates to new and useful improvements in workmen's carts, and in particular the invention concerns itself with a cart which is especially adapted for use by a workman while cutting and laying floor tile.

In ordinary floor tile laying procedure the workman usually kneels on the floor and selects tiles from a stack, also on the floor, and places selected tiles one after another into abutting relation. When working around baseboards, in corners or around other obstacles, the tiles usually have to be cut to fit, and for this purpose the workman employs a tile cutting machine which is also positioned on the floor. Manifestly, as the tile laying operation progresses, the workman finds it necessary to move not only himself, but the stack of tiles and the tile cutting machine as well. This, of course, is a time consuming procedure which substantially hampers the tile laying operation.

It is, therefore, the principal object of the invention to avoid the aforementioned disadvantage and to materially expedite floor tile laying, this being effected by the provision of a workman's cart which, as a whole, carries the cutting machine and a supply of tiles in addition to providing a seat for the workman in such manner that the workman has convenient access to the tile supply, to the cutting machine and to the floor, and is also conveniently able to propel the cart along the floor as the tile laying job progresses.

In addition to the foregoing, the cart of the invention provides a receptacle for scrap tile as well as storage space for various tools or other equipment used in tile laying, all conveniently located at the workman's mobile station.

As another feature of the invention, the workman's seat and the tile cutting machine may be readily removed from the cart and the cart itself is composed of two individual cart members which may be readily separated, so that the various components of the entire device may be easily transported from one site of operation to another.

The cart of the invention is simple in construction, efficient in use, and lends itself to economical manufacture.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIGURE 4 is a longitudinal sectional view, taken substantially in the plane of the line 4—4 in FIG. 3;

FIGURE 5 is an isometric view of the workman's seat which also serves as a tool container;

FIGURE 6 is a perspective view of the hook and eye connecting means between the cart members; and FIGURE 7 is a group elevational view showing the components of the device separated from one another for purposes of transportation, or the like.

Figure 1:
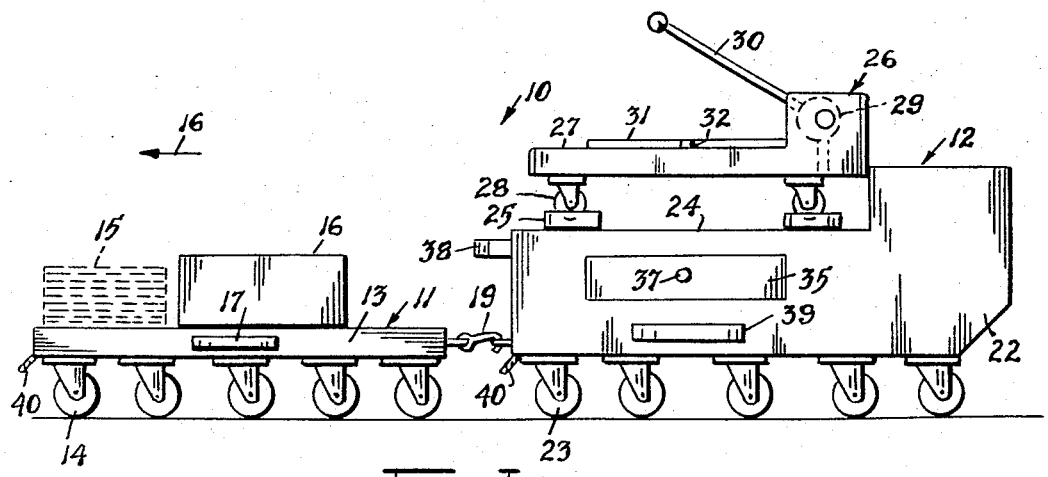
FIGURE 1 is a side elevation of the workman's cart in accordance with the invention.

Referring now to the accompanying drawings in detail, the workman's cart of the invention is designated generally by the numeral 10 and is especially adapted for use while cutting and laying floor tile. The cart 10 comprises two separably connected cart members, namely, a leading cart member 11 and a trailing cart member 12.

The leading cart member 11 consists of a platform 13 supported by casters 14 and affording thereon a space for a supply of floor tile in a stack, as indicated by the dotted lines 15. In addition, the platform 13 carries a removable box-like container 16 which serves as a seat for a rearwardly facing workman, it being understood that the cart is intended to be propelled forwardly in the direction of the arrow 16 by the seated workman who faces rearwardly in the direction of the trailing cart member 12.

The leading cart member 11 is provided at one side of the platform 13 with a carrying handle 17, so that the cart member may be conveniently transported when it is not in use. The rear of the platform 13 is equipped with a pair of transversely spaced yokes 18 having swingable hooks 19 thereon, the hooks 19 being adapted for separable connection to a pair of eyes 20 provided at the front end of the trailing cart member 12, whereby the trailing cart member is separably connected to the leading cart member and is pulled along therewith when the leading cart member is propelled by a seated workman on the seat 16. It will be also noted that the box-like container 16 which provides the seat on the leading cart member is formed with an opening 21 (see FIG. 5), so that access may be had to the interior thereof for the purpose of storage of tools, or the like.

The trailing cart member 12 is in the form of a hollow body 22 supported by a set of casters 23, the body 22 including a top wall 24 carrying a set of sockets or mounting blocks 25 for a tile cutting machine 26 which is removably positioned on the cart member 12. The machine 26 is of any suitable conventional construction which need not be described in detail, although for general descriptive purposes it will be noted that the machine includes a base 27 supported by casters 28, the base carrying a cam-type cutter assembly 29 actuated by a hand lever 30. A fixed guide 31 is provided on the machine base for guiding tiles to the cutter assembly, while an adjustable transverse guide 32 is movable on the base toward and way from the cutter assembly so that a tile may be cut at a selected distance from one of its side edges. The casters 28 of the machine 26 are removably seated in depressions 25′ provided in the mounting blocks 25, as will be clearly apparent.

The rear portion of the cart member body 22 projects above the top wall 24 and provides a receptacle 33 for scrap tile, the receptacle 33 having an open top and an inner partition wall 34 as is best shown in FIG. 4.

In addition, a suitable drawer 35 is provided in the body 22 below the top wall 24, the drawer being slidably supported by suitable rails or guides 36 (see FIG. 4) and having a pull knob 37. Conveniently, the drawer 35 may also be used to accommodate small tools, et cetera, employed in the tile laying operation.

For purposes of convenient carrying, the body 22 of the cart member 12 is provided at the front thereof with a handle 38 and at one side thereof with a similar handle 39.

Figure 2:
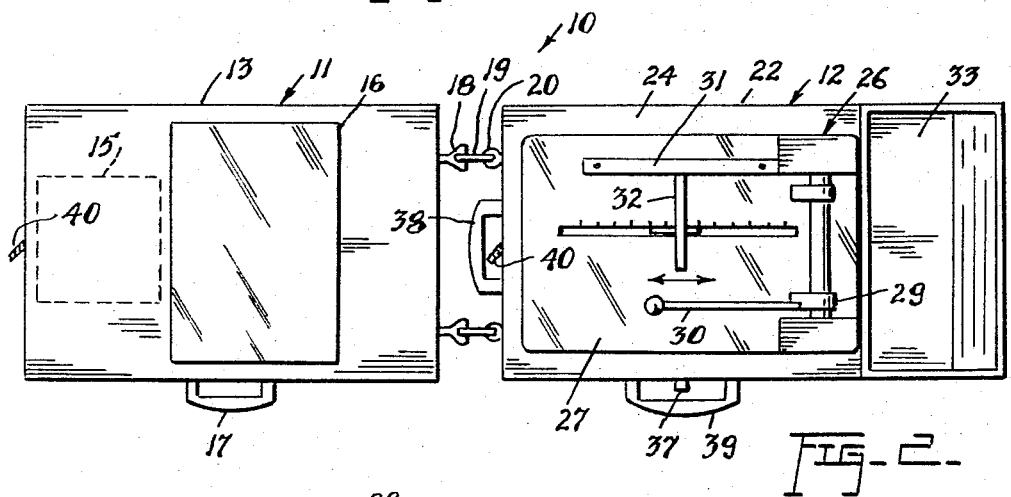
FIGURE 2 is a top plan view thereof.
Figure 3:
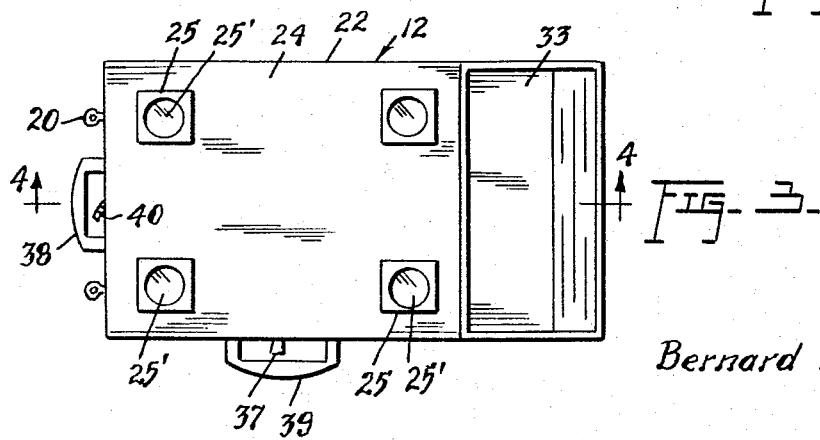
FIGURE 3 is a top plan view of the trailing cart member per se, with the tile cutting machine removed therefrom.

In operation, the device is assembled as shown in FIGS. 1 and 2 and the workman, after placing a supply of tiles 15 on the platform 13 of the cart member 11, seats himself on the seat 16 so that he faces rearwardly in the direction of the cart member 12. In that position, the workman may conveniently select tiles from the stack 15 and either place them directly on the floor or cut them at the machine 26 to an appropriate size before placing them on the floor. In either event, whatever tools the workman may require are readily accessible under the seat 16 or in the drawer 35, and scrap tile may be placed in the receptacle 33 instead of on the floor, so that it is not necessary to sweep the floor when the tiling operation is completed. Moreover, as the work progresses, the workman may simply propel himself and the entire cart by his feet, thus carrying the tile supply 15 as well as the tools in the seat 16 and drawer 35 and the tile cutting machine 26 along with him, so that the tiling operation need not be interrupted and time wasted by progressive moving of the facilities along the floor.

When the tiling operation is completed, the several components of the cart may be quickly and easily separated as shown in FIG. 7 for purposes of convenient transportation or storage. Suitable ropes, portions of which are illustrated at 40, may be connected to the cart members 11 and 12 so that they may be conveniently pulled along the floor when they are separated from each other and are to be moved from place to place.

While in the foregoing there has been described and shown the preferred emebodiment of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

What is claimed as new is:

1. A workman's cart particularly adapted for use while cutting and laying floor tile, said cart comprising a leading cart member including a platform affording a tile storage space, casters supporting said platform, a box-like container positioned on said platform in rear of and adjacent to said tile storage space and affording a seat for a rearwardly facing workman, a trailing cart member separably connected to the rear of said leading cart member, said trailing cart member including a hollow body having a top wall and provided rearwardly of said top wall with a receptacle for scrap tile, casters supporting said hollow body, mounting blocks provided on said top wall, and a tile cutting machine removably positioned on said mounting blocks and accessible to a workman on said seat.

2. The device as defined in claim 1 together with hook and eye means separably connecting said trailing cart member to said leading cart member.

3. The device as defined in claim 1 together with handles provided at the sides of said leading and trailing cart members for carrying the same when they are not in use.

References Cited

UNITED STATES PATENTS

| | | | |
|---|---|---|---|
| 273,157 | 2/1883 | Reid | 280—32.5 |
| 412,432 | 10/1889 | Tanner | 143—43 |
| 1,294,244 | 2/1919 | Doe | 280—460 |
| 1,588,969 | 6/1926 | Lemmer. | |
| 1,745,562 | 2/1930 | Taicher | 280—32.5 |
| 1,872,823 | 8/1932 | Sanford | 280—408 X |
| 2,201,420 | 5/1940 | Zschau. | |
| 2,573,767 | 11/1951 | Jensen et al. | 183—60.5 X |
| 2,933,325 | 5/1960 | Akins | 280—79.1 X |
| 2,981,549 | 4/1961 | Hotton | 280—79.2 X |
| 3,208,768 | 9/1965 | Hulbert | 280—408 |

KENNETH H. BETTS, *Primary Examiner.*